Figure 1:
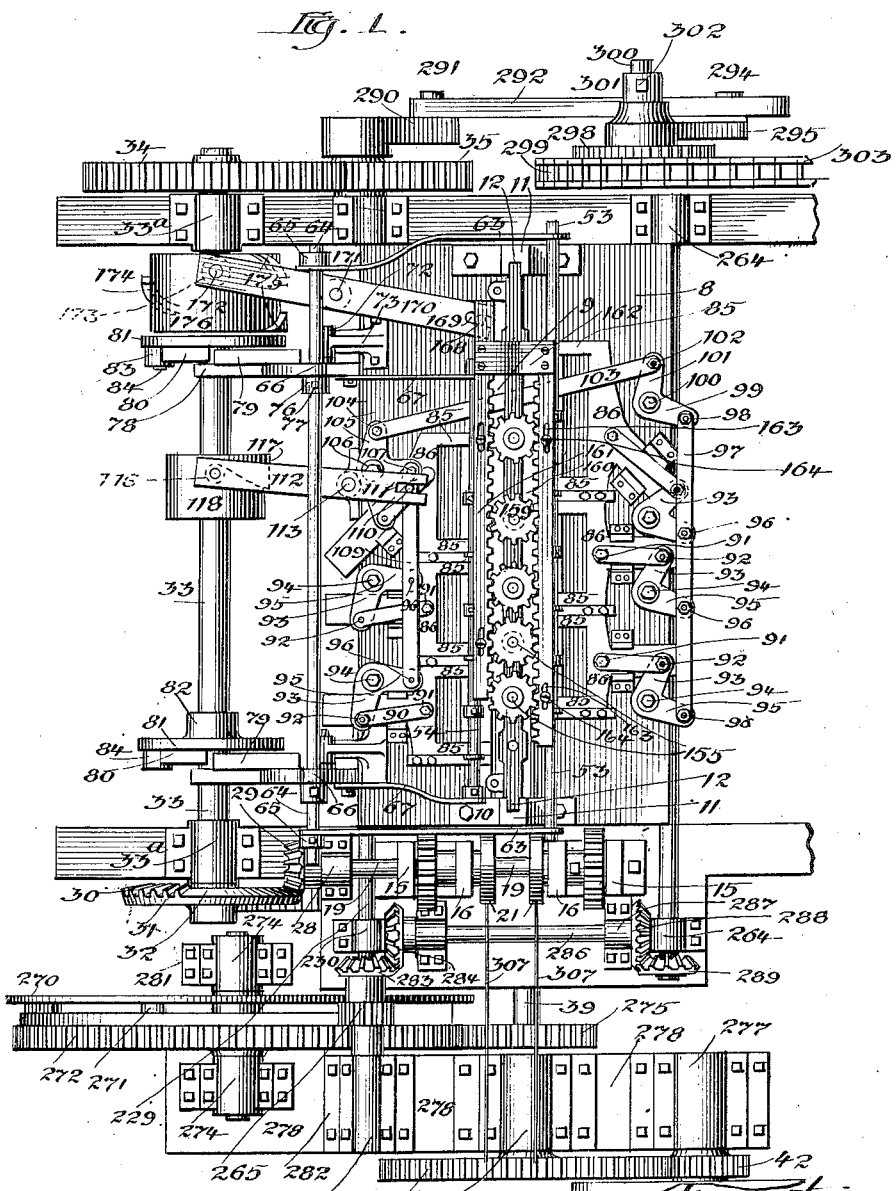

No. 845,170. PATENTED FEB. 26, 1907.
J. E. FREDRICK.
MACHINE FOR MAKING WIRE FENCES.
APPLICATION FILED MAY 26, 1906.

11 SHEETS—SHEET 1.

Witnesses:
Frank Blanchard
Oscar W. Bond

Inventor:
John E. Fredrick
By Barning & Barning
Attorneys.

No. 845,170. PATENTED FEB. 26, 1907.
J. E. FREDRICK.
MACHINE FOR MAKING WIRE FENCES.
APPLICATION FILED MAY 26, 1906.
11 SHEETS—SHEET 2.
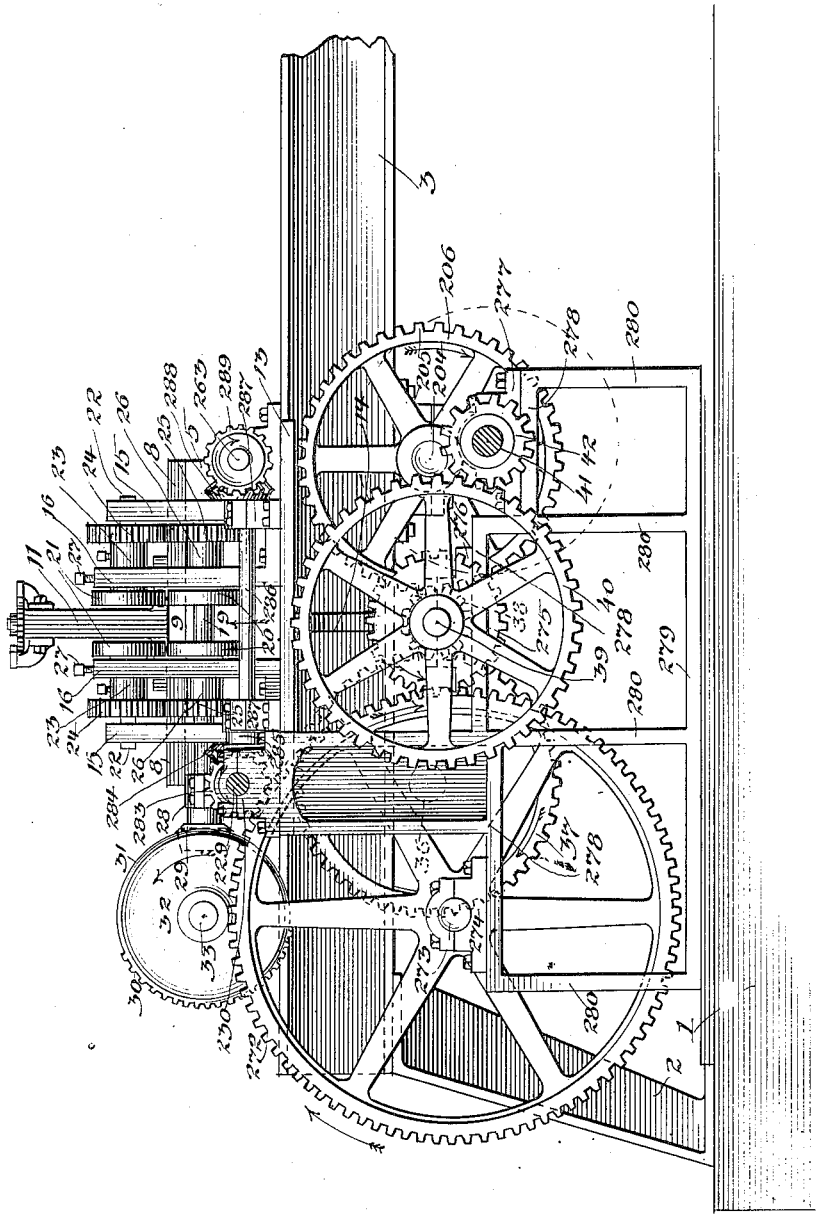

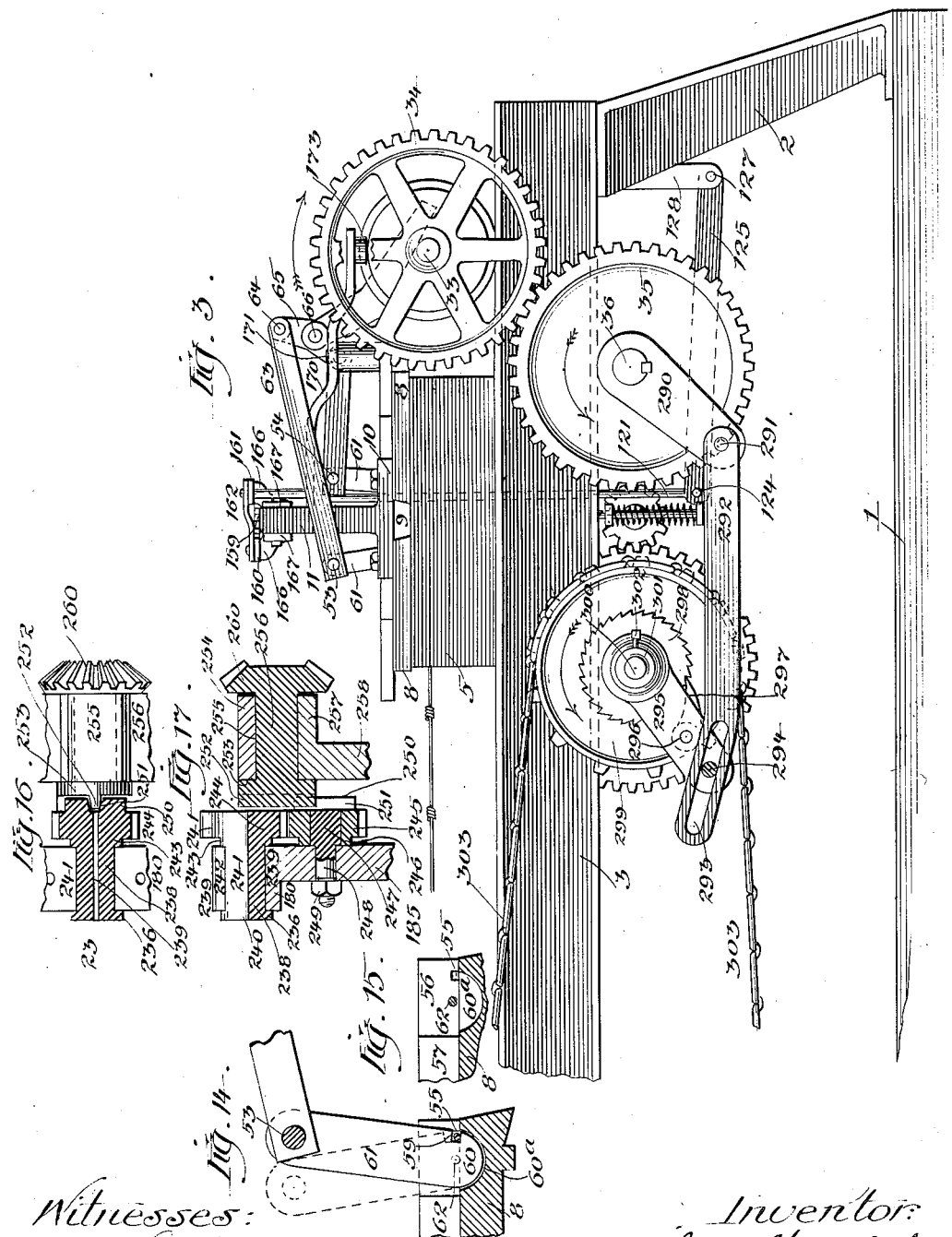

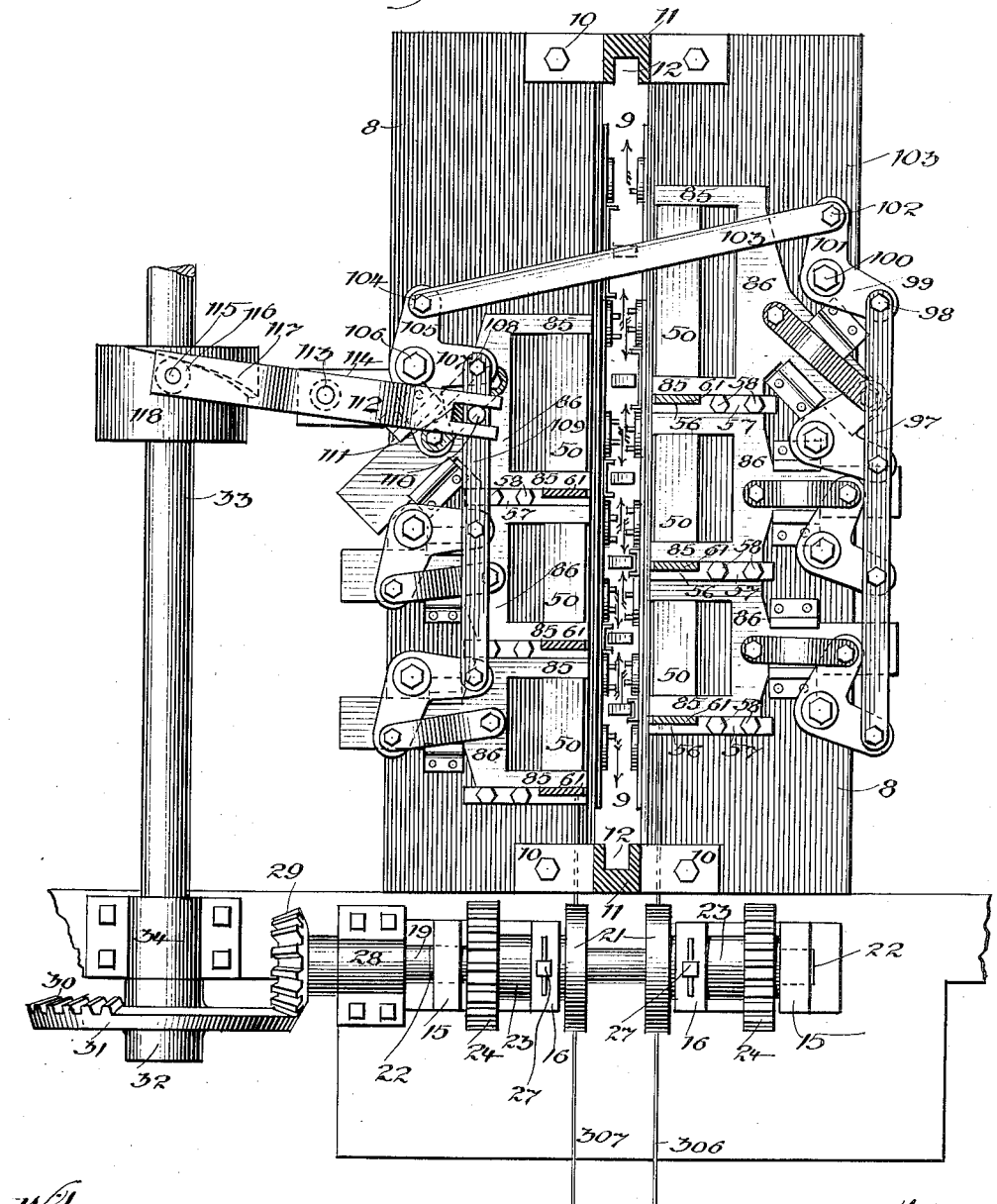

No. 845,170. PATENTED FEB. 26, 1907.
J. E. FREDRICK.
MACHINE FOR MAKING WIRE FENCES.
APPLICATION FILED MAY 26, 1906.
11 SHEETS—SHEET 5.
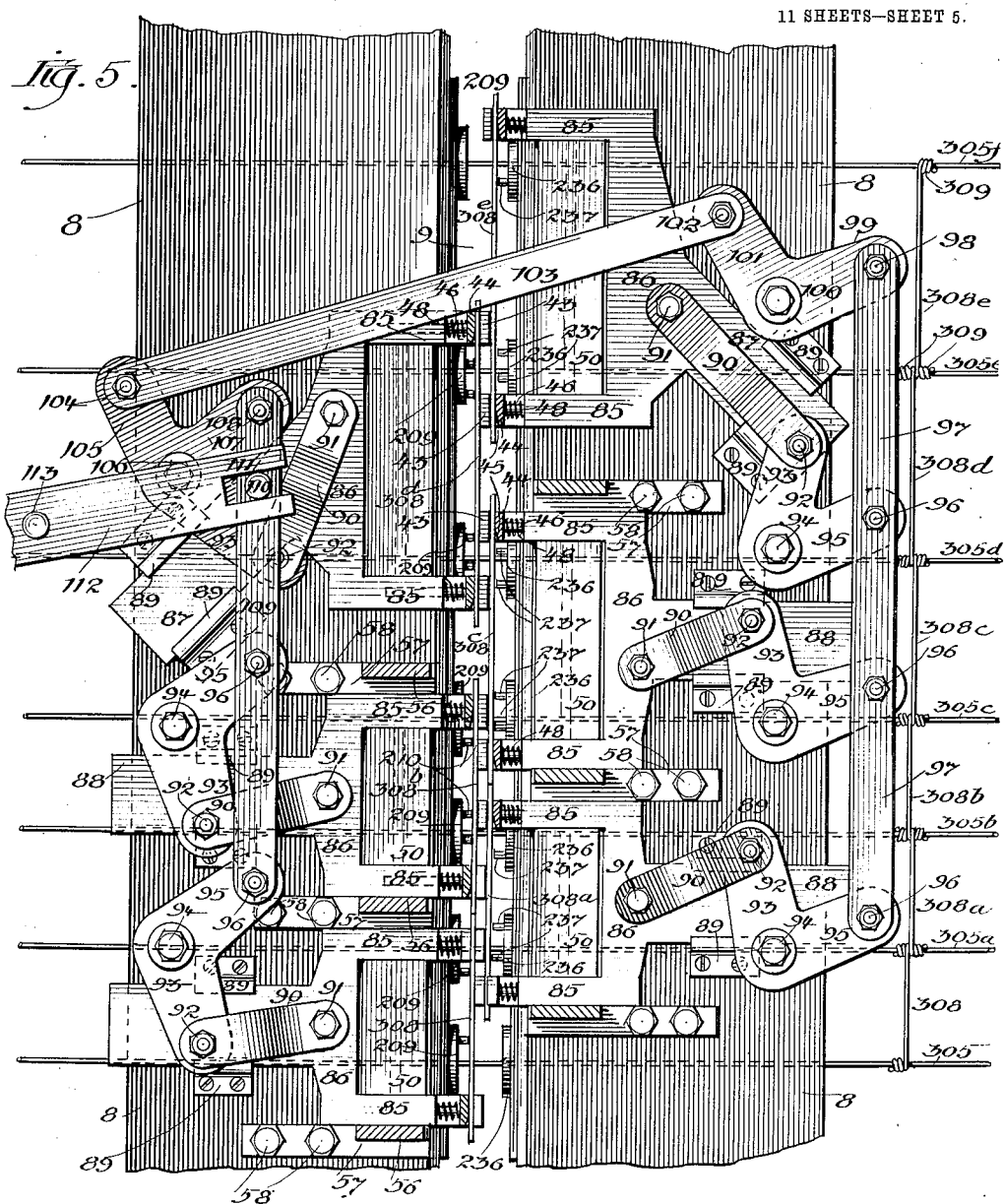
Witnesses:
Frank Blanchard
Oscar W. Bond
Inventor:
John E. Fredrick
By Banning & Banning
Attorneys

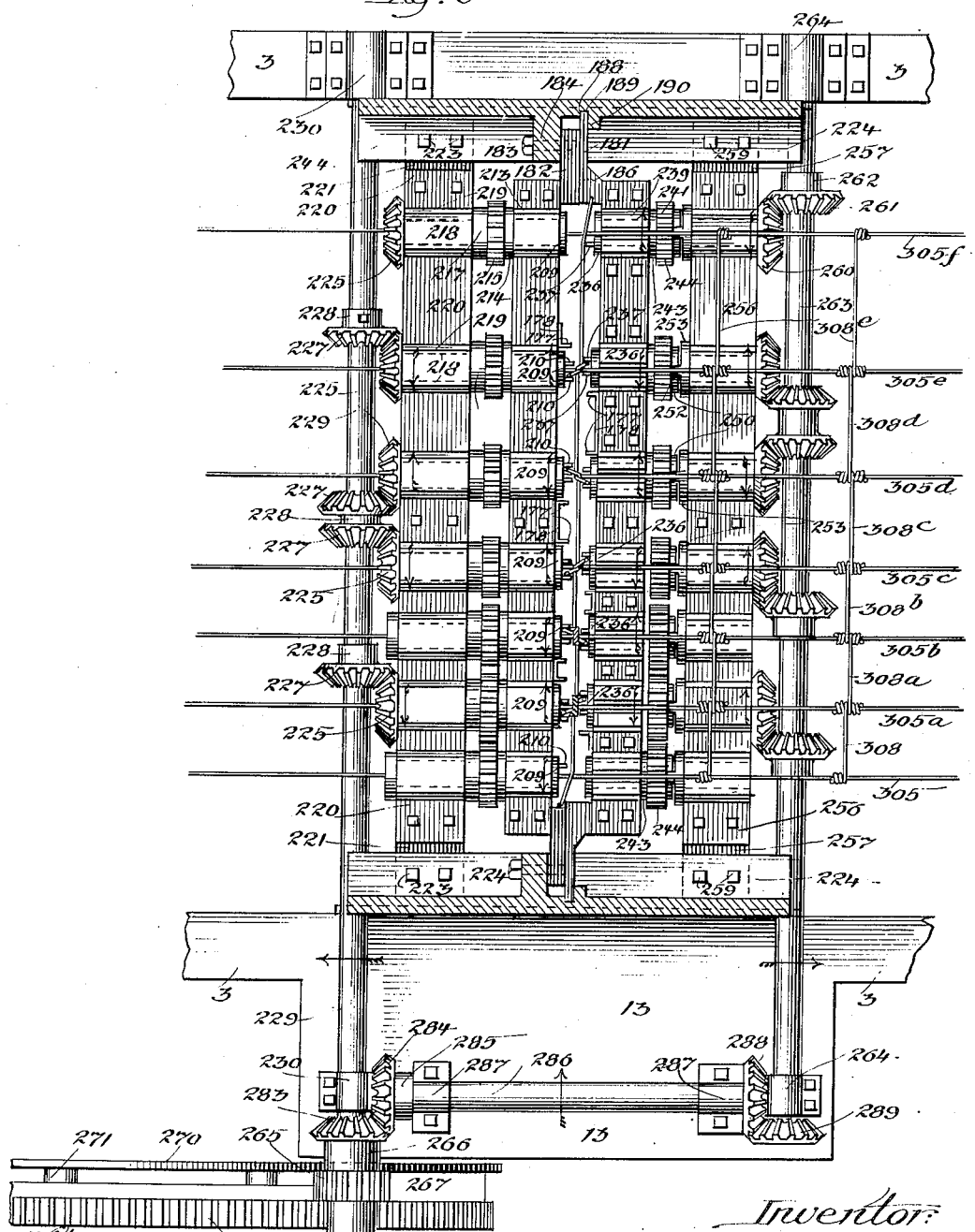

No. 845,170. PATENTED FEB. 26, 1907.
J. E. FREDRICK.
MACHINE FOR MAKING WIRE FENCES.
APPLICATION FILED MAY 26, 1906.
11 SHEETS—SHEET 7.
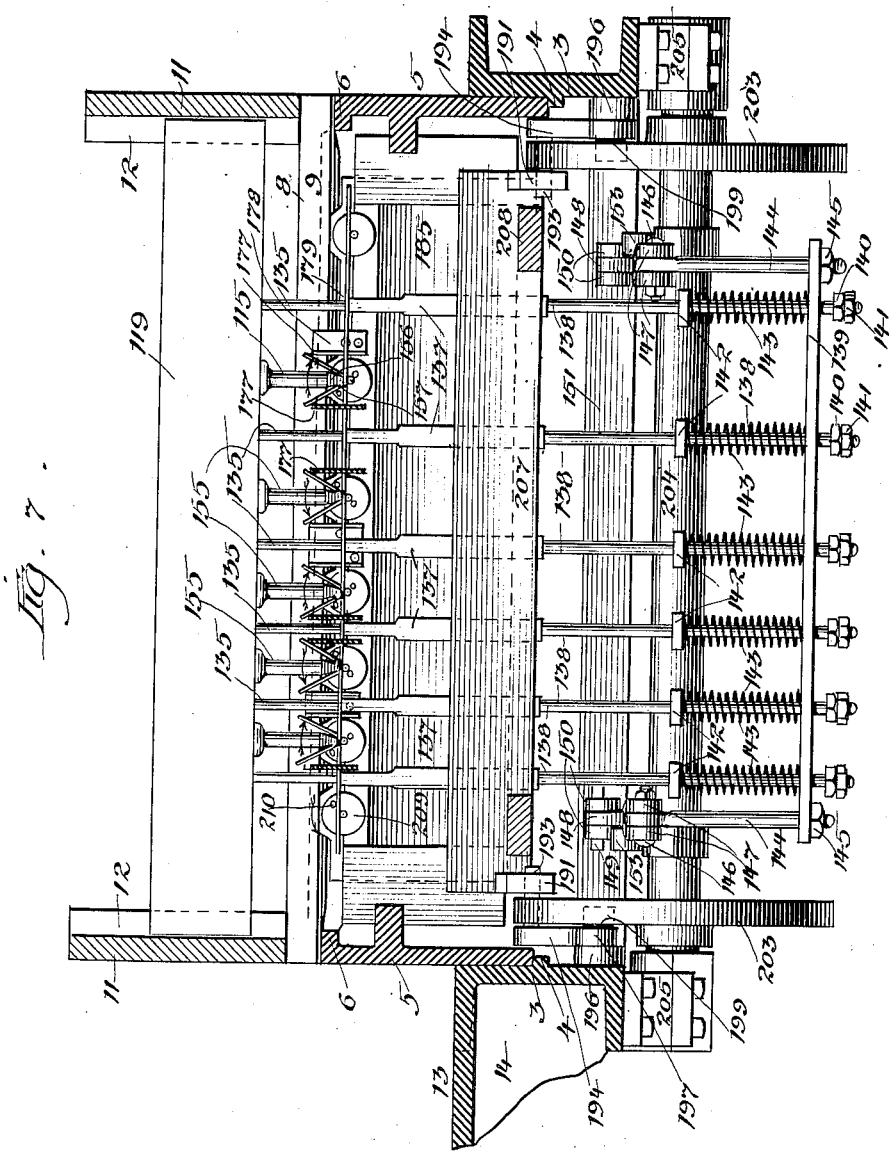
Witnesses:
Frank B. Blanchard
Oscar W. Bond
Inventor:
John E. Fredrick
By Banning & Banning
Attorneys.

No. 845,170. PATENTED FEB. 26, 1907.
J. E. FREDRICK.
MACHINE FOR MAKING WIRE FENCES.
APPLICATION FILED MAY 26, 1906.
11 SHEETS—SHEET 8.
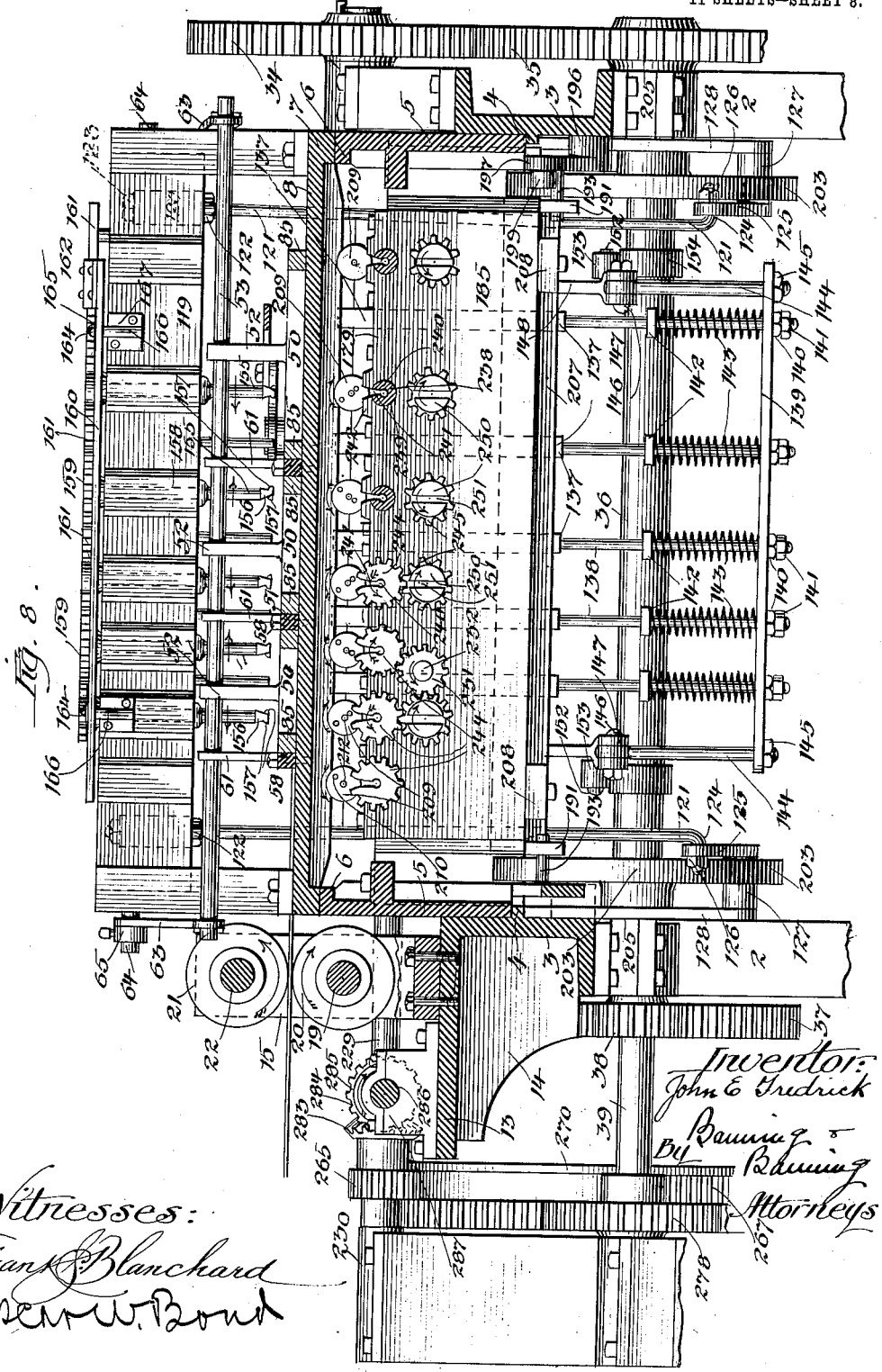

No. 845,170. PATENTED FEB. 26, 1907.
J. E. FREDRICK.
MACHINE FOR MAKING WIRE FENCES.
APPLICATION FILED MAY 26, 1906.
11 SHEETS—SHEET 9.
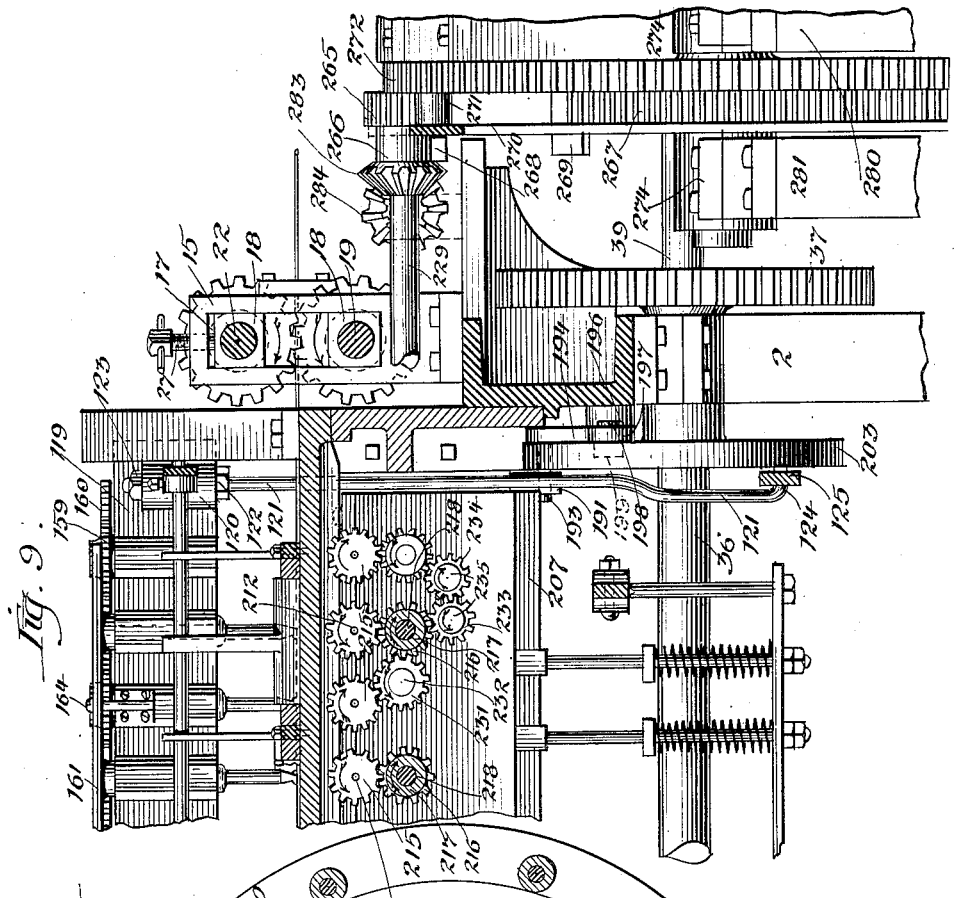
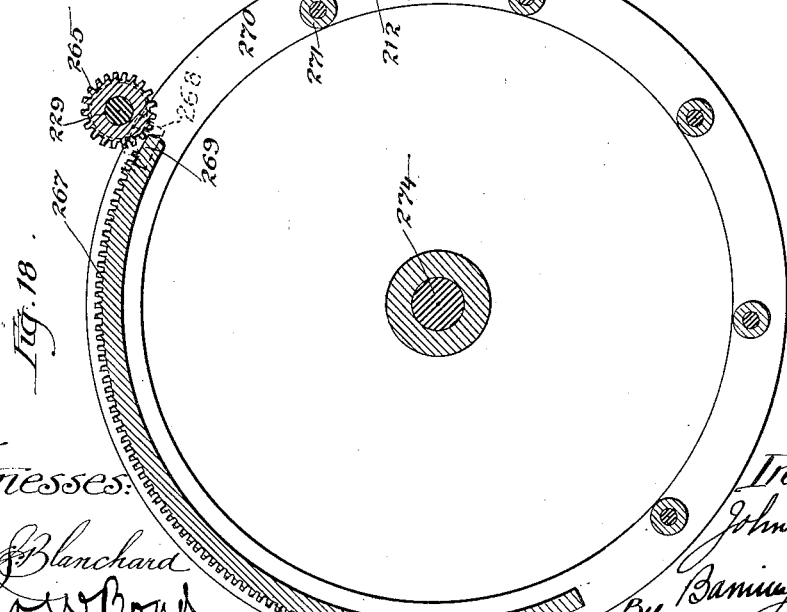
Witnesses:
Frank Blanchard
Oscar W. Bond
Inventor:
John E. Fredrick
By Banning & Banning
Attorneys.

No. 845,170. PATENTED FEB. 26, 1907.
J. E. FREDRICK.
MACHINE FOR MAKING WIRE FENCES.
APPLICATION FILED MAY 26, 1906.
11 SHEETS—SHEET 10.

Witnesses:
Frank Blanchard
Oscar W Bond

Inventor:
John E. Fredrick.
By Banning & Banning
Attorneys

No. 845,170. PATENTED FEB. 26, 1907.
J. E. FREDRICK.
MACHINE FOR MAKING WIRE FENCES.
APPLICATION FILED MAY 26, 1906.

11 SHEETS—SHEET 11.

Witnesses:
Frank Blanchard
Oscar W. Bond

Inventor
John E. Fredrick
By Banning & Banning
Attorneys.

UNITED STATES PATENT OFFICE.

JOHN E. FREDRICK, OF KOKOMO, INDIANA.

MACHINE FOR MAKING WIRE FENCES.

No. 845,170.  Specification of Letters Patent.  Patented Feb. 26, 1907.

Application filed May 26, 1906. Serial No. 318,802.

*To all whom it may concern:*

Be it known that I, JOHN E. FREDRICK, a citizen of the United States, residing at Kokomo, in the county of Howard and State of Indiana, have invented certain new and useful Improvements in Machines for Making Wire Fences, of which the following is a specification.

This invention relates to machines for use in making wire fences consisting of longitudinal or strand wires and vertical or stay wires crossing the longitudinal or strand wires at right angles, so as to form, in effect, a square mesh. The vertical or stay wires are formed in sections, and each section has its ends coiled around the strand-wires, between which the section of the vertical or stay wire is located, in such manner that the adjacent ends of the sections of the vertical or stay wire on a longitudinal or strand wire will interlock with and abut against each other and be coiled around the longitudinal or strand wire in opposite directions of coiling.

The objects of the invention are to improve the construction, arrangement, and operation of the mechanism by which the vertical or stay wire sections are severed and delivered in position over the longitudinal or strand wires; to furnish a carrier for each section of the vertical or stay wire, each carrier having a clamp formed of a fixed jaw and a movable jaw by which the stay-wire sections are held and retained after severance from the main wire; to furnish the carrier of each stay-wire section with a rocking receiver for guiding and retaining the main wire in its passage into position for severing into the stay-wire sections; to improve the construction, arrangement, and operation of the mechanism for coiling the ends of the stay-sections around the longitudinal or strand wires; to furnish a fixed coiling mechanism and a rising and falling coiling mechanism by which the ends of the stay-sections will be coiled around the longitudinal or strand wires and driving each set or series of coilers for the respective mechanisms by spur and bevel gears; to operate the coilers of the rising and falling coiling mechanism by a fixed driving-shaft with an interlocking head engaging the spur-gear of the coiler-shaft, so that the coilers can be dropped to clear the longitudinal or strand wires and permit the complete fence to be advanced; to actuate the coilers for the ends of the stay-sections around the longitudinal or strand wires in opposite directions through the medium of revoluble shafts; to intermittently actuate the several mechanisms at the proper time for feeding the stay-wires and the longitudinal or strand wires, and to improve generally the construction and operation of the several mechanisms which enter into the machine as a whole.

The invention consists in the features of construction and combinations of parts hereinafter described and claimed.

Figure 10:
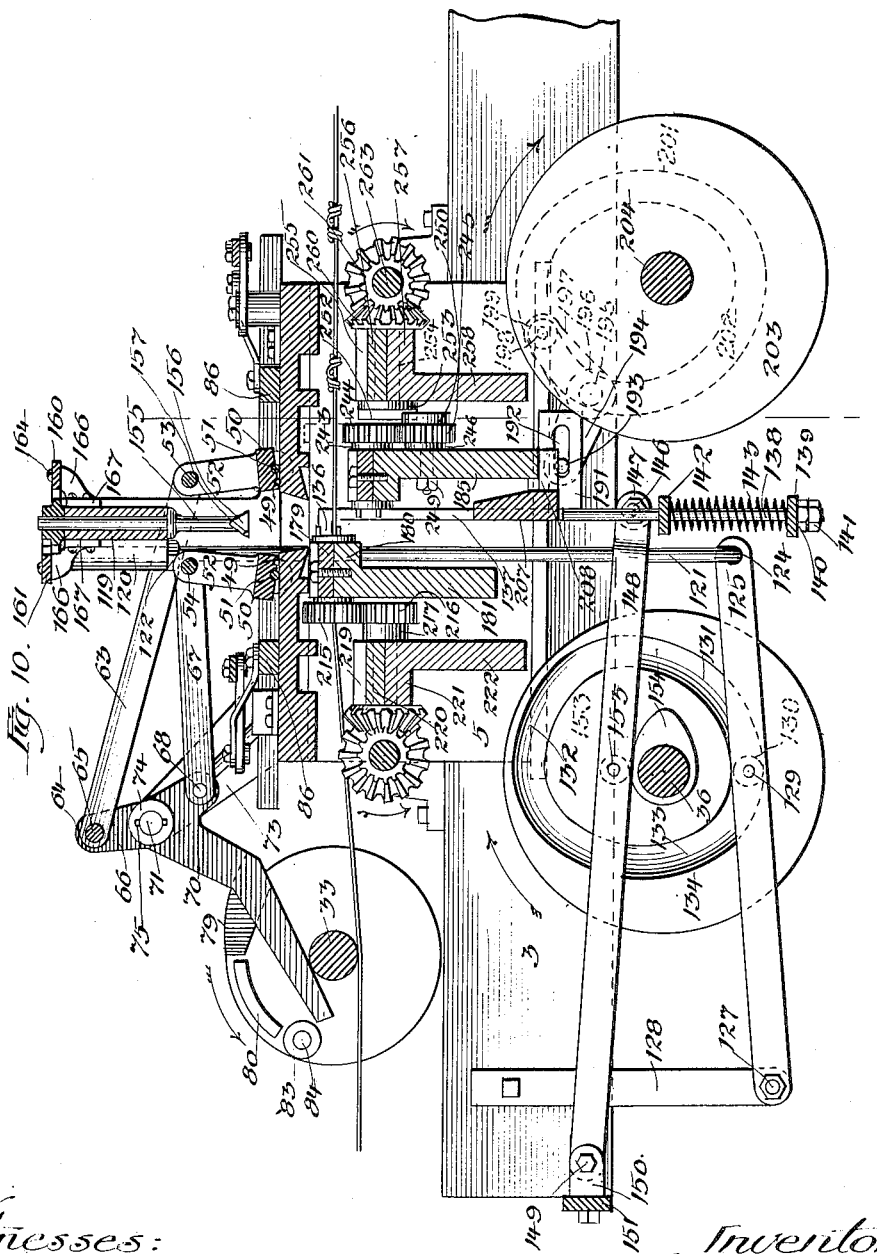
Figure 11:
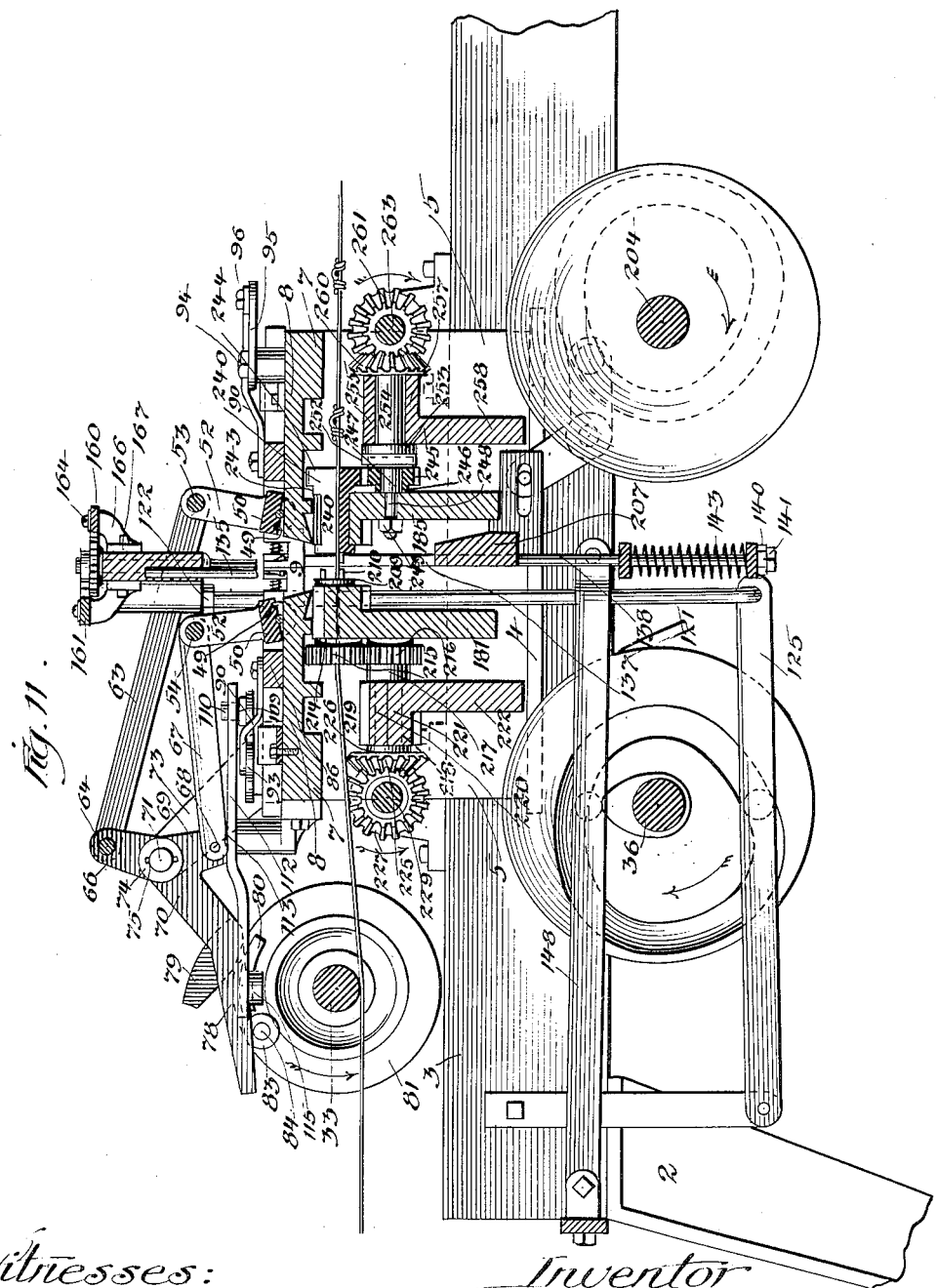

In the drawings, Figure 1 is a top or plan view of the machine, a portion of the framework being broken off and the main driving-pulley broken away; Fig. 2, a side elevation with the main frame broken off and with the driving-pulley shown in dotted lines; Fig. 3, a side elevation showing the opposite side to Fig. 2 with the frame broken off; Fig. 4, a top or plan view of the table or platform, showing the feed for the stay-wires and the carriers and cutters for severing the stay-wires into the sectional stay; Fig. 5, a top or plan view, enlarged as compared with Fig. 4 and showing the carriers and the cutters for the sectional stay; Fig. 6, a top or plan view, partly in section, showing the coilers or twisters for winding or coiling the ends of the stay-sections around the longitudinal or strand wires; Fig. 7, a cross-section showing the initial twisters for interlocking the ends of the stay-sections and one series of coilers or twisters for coiling or winding the ends of the stay-sections around the longitudinal or strand wires; Fig. 8, a cross-section showing the initial twisters for interlocking the ends of the stay-sections and the series of rising and falling coilers or twisters for coiling or winding the ends of the stay-sections around the longitudinal or strand wires and showing also the feed for the stay-wires; Fig. 9, a detail in sectional elevation of one end of the coiling mechanism for the ends of the stay-sections around the longitudinal or strand wires; Fig. 10, a longitudinal sectional elevation showing the rising and falling coilers for the ends of the stay-sections around the longitudinal or strand wires in depressed position; Fig. 11, a similar view to Fig. 10, showing the rising and falling coilers for the ends of the stay-sections around the longitudinal or strand wires in elevated and operative position; Fig. 12, a detail, being a side elevation of the clamp for holding the stay-sections while being advanced in position to overlie the longitudinal or strand wires; Fig. 13, a top or plan view, partly in section, of the clamp of Fig. 12; Fig. 14, a detail, partly in section, showing the fixed and movable cutters for severing the stay-wires into stay-sections; Fig. 15, a detail, partly in section, showing the fixed cutter for severing the stay-wire into stay-sections; Fig. 16, a detail, partly in section, showing the rising and falling coiler and the driving-gear therefor by which the ends of the stay-sections are wound or coiled around a longitudinal or strand wire; Fig. 17, a sectional elevation of the parts shown in plan in Fig. 16; and Fig. 18, a detail showing the mutilated gear and the spur-pinion coacting therewith for giving an intermittent rotation to the driving-shafts for the coilers by which the ends of the stay-sections are wound or coiled around the longitudinal or strand wires.

The mechanisms of the machine are mounted or supported on a suitable frame, which frame, as shown, consists of a stringer or base-rail 1, to which is secured the lower ends of corner-legs 2, on the upper ends of which are mounted longitudinal beams 3, on which beams the various mechanisms are supported. Each side beam 3 has a ledge or shoulder 4, on which rests the lower edge of a side plate 5, each side plate being bolted or otherwise secured to the side beam or rail 3 on each side. Each plate 5 at its upper end has a flange or head 6, on which rests a flange 7 of a platform or plate 8, arranged to have a space 9 between the two platforms or plates, which space permits the depressing of the stay-sections into position for the ends of the stay-sections to be wound or coiled around the longitudinal or strand wires. At each end of the platforms or plates 8 and in line with the slot or opening 9 on each side is a flange or ear 10, bolted to the platforms or plates, and the ears or flanges 10 extend out from an upright or standard 11, each upright or standard 11 having in its inner face a vertical slot or guideway 12, which guideway or slot is centrally in line with the slot or opening between the platforms or plates. The top rail or beam 3 on one side has extending out therefrom a table or plate 13, supported by brackets 14 from the side rail or beam and furnishing a support for the standards or posts of the frame for the feed-wheels for the stay-wires. The frame for the feed-wheels of the stay-wires in the construction shown consists of two outer posts or standards 15 and two inner posts or standards 16. Each post or standard 15 and 16 has a slot or opening 17, in which, at the lower end thereof, is located the journal box or bearing 18 for a driving-shaft 19, which extends across the space between the two inner standards, as shown in Figs. 1 and 2. The shaft 19 has fixedly mounted thereon, adjacent to each post or standard 16, a feed-wheel 20, and above and in line with each feed-wheel 20 is a feed-wheel 21 for the feed-wheels 20 and 21 on each side to operate and in feed or advance a stay-wire. Each feed-wheel 21 is fixedly mounted on the end of a short shaft 22, so as to leave a clear space between the feed-wheels 21, and each shaft 22 is supported in a journal-box 18$^a$ in the upper portion of the slot or opening 17 of the posts 15 and 16, as shown in Fig. 9. Each shaft 22 has fixedly secured thereto by a set-screw or otherwise the hub 23 of a spur-gear 24, and each spur-gear 24 meshes with a spur-gear 25, the hub 26 of which is fixedly secured by a set-screw or otherwise to the shaft 19, so that the revolving of the shaft 19 will revolve the feed-wheels 20 and through the spur-gears 24 and 25 revolve the upper feed-wheels 21 simultaneously. The construction shown has the journal-box 18$^a$ for the upper shafts 22 in the posts or uprights carried by a threaded bolt or stem 27, by which the feed-wheels 21 can be raised and lowered and properly adjusted to coact with the feed-wheels 20 and in feed or advance the stay-wires.

The shaft 19 is supported in a journal-box 28 on the table or plate 13 and has fixedly attached to its end a bevel-gear 29, which meshes with a mutilated bevel-gear 30 of a wheel 31, the hub 32 of which is fixedly attached to the end of a shaft 33, mounted in suitable journal boxes or bearings 33$^a$, attached to the upper side or top of the rails 3 and extending crosswise of the machine from side rail to side rail, as shown in Fig. 1. The opposite end of the shaft 33 has fixedly secured thereto a spur-gear 34, which meshes with a spur-gear 35, fixedly secured to the end of a cross-shaft 36, supported in suitable journal boxes or bearings on the under side of the rails 3, and the opposite end of the shaft 36 has fixedly secured thereto a spur-gear 37, which meshes with a spur-pinion 38 on a stud-shaft 39, on which shaft is fixedly secured a gear 40, which meshes with a pinion 41 on the main driving-shaft 42, so that the revolving of the shaft 42 will, through the pinion 41, gear 40, shaft 39, spur-pinion 38, and spur-gear 37, drive the shaft 36, and through the spur-gears 35 and 34 revolve the shaft 33 continuously for the shaft 33 through the mutilated gear 30 to impart an intermittent rotation to the bevel-gear 29, by which the shaft 19 will be given an intermittent revolution, transmitting an intermittent rotation to the feed-wheels 20 and 21, by which the two stay-wires will be given an intermittent infeed or advance at the proper time. The stay-wire on each side is infed or advanced and is received by a series of clamps or retainers. Each clamp or retainer consists of a fixed jaw or element 43 and a movable jaw or element 44, having in its front face at the lower portion a recess 45, into which the stay-wire enters. Each movable jaw or element 44 is carried by a stem 46, entering a hole 47 in the arm of a carrier, and the movable jaw or element is held in its advanced position and so as to be yieldable for the insertion and withdrawal of the stay-section by a coiled spring 48, encircling the stem 46 and located between the movable jaw or element and the end face of the arm of the carrier, as shown in Figs. 12 and 13. The stay-wire on each side is received into the groove 49 of a retainer or holder 50, supported on a bearing 51, so as to be free to rock or oscillate on the bearing, and each holder or retainer 50 has an arm 52, which arms on one side are connected to a rod or bar 53 and on the opposite side are connected to a rod or bar 54, so that as the rods or bars are moved in and out the several holders or retainers will be simultaneously rocked or oscillated.

The stay-wire on each side is severed into lengths for forming the sections of the stay. Each stay-wire in the construction shown is severed into three sections or lengths, and each stay-wire passes through a notch or recess 55 of a fixed cutter 56, formed on a bar 57, attached by bolts 58 or otherwise to the platform or plate 8 on each side of the slot or opening 9 between the platforms or plates. The stay-wire on each side also passes through a recess or notch 59 of a movable cutter 60, having a curved edge entered into a depression 60ª in the platform or plate 8. (Shown in Figs. 14 and 15.) Each movable cutter is formed on or with an arm 61, pivotally supported on a pivot or pin 62 and connected at its upper end to the rod or bar 53 on one side and to the rod or bar 54 on the opposite side, so that the severing operation will occur simultaneously with the rock of the holders or retainers 50 for the stay-wire, thereby releasing the stay-section from the retainer or holder after severance thereof, so that each stay-section is free to be carried forward or advanced into position over the longitudinal or strand wires.

At each end of the rod or bar 53 is secured one end of a strap or link 63, the other end of which is connected with a rod or bar 64, on which at each end is attached by a set-screw or otherwise an arm 65, supporting the rod or bar 64 at the end. The rod or bar 64 has attached thereto an arm 66 of a bell-crank lever. The rod or bar 54 at each end has attached thereto a strap or link 67, the other end of which is attached to a pin or pivot 68, extending out from an arm 69 of the bell-crank lever, having the arm 66 thereon. The bell-crank lever, having the arms 66 and 68, has an arm 70 and is mounted on a journal pin or pivot 71, secured in a socket or bearing 72 on a bracket-arm 73, bolted or otherwise secured to the platform or plate 8, as shown in Fig. 1. The bell-crank lever is held in position between the end face of the socket or bearing 72 and a washer 74, mounted on the journal pin or pivot 71 and held in place by a cross-pin 75, passing through the journal pin or pivot, and the bell-crank lever is secured to the rod or bar 65 by a hub 76 on the arm 66 and a set-screw 77 or otherwise, so as to be firmly locked to the bar or rod. The arm 70 of the bell-crank lever has an extension or foot 78 and a shoe 79, which shoe is arranged to engage with a ledge or track 80 on a disk 81, attached to the shaft 33 by a hub 82, so as to revolve with the shaft, and the disk 81 carries a roller 83, mounted on a journal-pin 84, which roller as the disk is revolved engages the under side of the shoe 79 and raises the arm 70, advancing the arm 66 and receding the arm 69, by which the straps 63 will move the bar or rod 53 and rock the plates or heads 50 backward, so as to raise the recess 49 clear of the stay-wire, and at the same time the straps or links 67 move the bar or rod 54 to rock the block or head 50 and raise the edge to release the recess 49 from the stay-wire. The movement of the rods 53 and 54 just described moves the arms or levers 61 of the movable cutters rearward for the movable cutters, in connection with the fixed cutters, to sever the stay-wires into the stay-sections at the proper point for the stay-sections on the two sides when brought together to overlie the longitudinal or strand-wires for their ends to be wound or coiled around the longitudinal or strand wires and form a sectional stay for all of the longitudinal or strand wires. The arms or levers 52 and the arms or levers 61 are held in their raised position, as shown in Fig. 11, for the arm 52 until the shoe 79 passes the end of the track 80, at which time the foot 78 drops and the holders or retainers and the cutters are returned to normal position for the reception of a further length of stay-wire to be severed into stay-sections, and the holders or retainers and the cutters will remain in normal position until the full length of stay-wire has been infed or advanced, at which time the disk 81 will have revolved to a point where the roller 83 will engage the shoe 79 and operate the bell-crank lever to rock or oscillate the holders or retainers 50 and actuate the movable cutters 60, as hereinbefore described.

The clamps formed by the fixed jaw 43 and the movable jaw 44 are each located on the arm 85 of a carrier, between which arms are also located the holders or retainers 50, and when in normal position the opening or slot 45 for each clamp is in line with the slot or recess 49 of the holder or retainer, so that the stay-wire is free to be in fed or advanced to full position. The arms 85 for each carrier extend out from a bar 86, and the end bar 86 on each side has an inclined arm or stem 87, and the remaining arms 86 have a straight-line arm or stem 88, as shown in Fig. 5. The arms or stems 87 and 68 are held in place so as to be free to be advanced and receded by guides 89, attached to the platforms or plates 8 by screws or otherwise. Each cross bar or head 86 of each carrier has attached thereto a link or strap 90 by a pivot pin or bolt 91, and the opposite end of each link or strap 90 is attached by a pivot pin or bolt 92 to the arm 93 of a bell-crank lever pivotally supported on the plate or platform 8 by a suitable pivot pin or bolt 94, and the other arm 95 of the bell-crank lever is attached by a suitable pivot pin or bolt 96 to a connecting bar or plate 97 for one set of carriers, as shown in Fig. 5. The plate or bar 97 at one end is attached by a pin or pivot-bolt 98 to the arm 99 of a bell-crank lever, pivotally mounted on the platform or plate 8 by a pivot pin or bolt 100, and the other arm 101 of the bell-crank lever is connected by a pivot pin or bolt 102 to a strap or link 103, the other end of which is connected by a pivot pin or bolt 104 to the arm 105 of a bell-crank lever mounted on a pivot pin or bolt 106 on the plate or platform 8 and having an arm 107, connected by a pivot pin or bolt 108 to a plate or bar 109, to which is connected the arms 95 of the bell-crank levers for the opposite set of carriers, as shown in Fig. 5. The plate or bar 109 carries a pin or stud 110, entering a slot 111 in a lever or arm 112, supported by a pivot 113, extending up from a bracket 114, attached to the plate or platform 8, as shown in Fig. 4. The outer or free end of the lever or arm 112 has a pin or journal 115, on which is mounted a roller 116, engaged by a cam 117 on a disk 118, fixedly mounted on the shaft 33, so as to revolve with the shaft.

The disk 118 as it revolves causes one section of the cam 117 to engage the roller 116 and move the arm or lever 112 in the direction to move the plates or bars 97 and 109 in the direction to oscillate the bell-crank levers and move the carriers from their normal position (shown in Figs. 1 and 4) to their advanced position, (shown in Fig. 5,) and such movement of the carrier occurs after the stay-wires have been severed into sections and the sections released from the holders or retainers. The advance of the carriers to the position shown in Fig. 5 carries the stay-sections in position over the longitudinal or strand wires, so that the ends of the stay-sections will preferably overlap each other the necessary length for coiling or winding the ends around the longitudinal or strand wires, and while being carried to the advance position the stay-sections are held between the clamps of the respective carriers. The continued revolution of the disk 118 causes the opposing cam 117 to engage the roller 116 and move the arm or lever 112 in the opposite direction from that just described, and such movement of the arm or lever 112 moves the plates or bars 97 and 109 back, thereby reversing the throw of the bell-crank levers and returning the carriers to their normal position, as shown in Figs. 1 and 4. The return movement of the carriers takes place after the stay-sections have been caught and removed from the clamps, and when the carriers are returned to normal position the holders or retainers and the cutters have been returned to normal position, and the parts are in condition to operate on the next length of stay-wire to be formed into sections.

A cross-head 119 has its ends entered into the slots or guideways 12 of the uprights or standards 11, so that the cross-head is free to be lowered and raised. The cross-head at each end has a boss or socket 120, into which is entered the end of a rod 121, having a screw-thread receiving an under nut 122 and an upper nut 123, by means of which the proper adjustment for the length of the rod in relation to the cross-head can be obtained. Each rod 121 at its lower end is inwardly turned to form a pivot 124, which passes through the end of an arm 125, and is secured in place by a nut 126 or other suitable means. The arm or lever 125 is attached or mounted on a pin or pivot 127, projecting out from a bracket 128, attached to the upper rail or beam 3 of the frame, and a rod 121, with an arm or lever 125, is used for each end of the cross-head 119, so as to insure a uniform descent and ascent of the cross-head. Each arm or lever has a pin or pivot 129, on which is mounted a roller 130, arranged to enter a cam-groove having sections 131, 132, and 133, as shown in Figs. 10 and 11, so that as the different sections of the cam-groove engage the roller 130 the free end of the arm or lever 125 will be forced down or up to lower and raise the cross-head. The cam-groove for the roller 130 is formed in a disk 134, and each disk 134 is fixedly attached to the shaft 36, so that as the shaft 36 revolves the disk will be revolved and cause the cam-groove to act in conjunction with the roller and move the arm or lever 125 to lower and raise the cross-head 119 and the parts connected therewith. The cross-head 119 carries a plurality of rods or stems 135, which are lowered and raised with the cross-head. Each rod or stem 135 has a coacting head 136 on the end of a bar 137, so that the descent of the cross-head will cause the ends of the rod or stem to engage the stay-sections and force the stay-sections down to be caught and held between the ends of the rods or stems 135 and the heads 136 and in position for the ends of the stay-sections to be caught by the coiler-pins and coiled or wound around the longitudinal or strand wires. The bars 137 are each carried by a rod 138, and each rod 138 at its lower end passes through a cross-bar or plate 139 and receives a stop-nut 140 and an adjusting-nut 141 for limiting the upward movement of the head 136 in each instance. Each rod 138 has fixed thereon a block or stop 142, and encircling each rod or stem 138, between the cross-bar 139 and the stop 142, is a coiled spring 143, by means of which the head of each bar 137 is returned to normal position after depression. The cross-bar or plate 139 at each end has secured thereto a rod or stem 144 by a nut 145, and the upper end of each rod or stem 144 is connected to a pivot 146 between ears 147 of an arm or lever 148, the end of which is attached by a pin or pivot 149 between ears 150 of a plate 151, attached to the end of each top or side rail 3 in the arrangement shown. Each arm or lever 148 has a pin or pivot 152, on which is a roller 153, which is engaged by a cam 154 on the shaft 36, so that the cam will revolve with the shaft.

The engagement of the rods or stems 135 with the stay-sections and the downward movement of the stay-sections against the heads 136 forces down the bars 137 and the rods 138, together with the bar 139, so as to allow of the necessary descent of the stay-sections to bring the stay in proper relation over the longitudinal or strand wires, and in position for the coilers or twisters to act and coil or wind the ends of the stay-sections around the longitudinal or strand wires. The return of the rods or stems 135 to normal position will release the engagement with the head 136, and with such release the cams 154 engage the rollers 153 and elevate the arms or levers 148, raising the bar 139, and with it the series of rods 138, bars 137, and heads 136, for the heads to occupy the normal position to receive the next series of stay-sections.

The cross-head 119 carries a plurality of stems 155, each stem having a head 156, with lips 157, which lips are for the purpose of engaging the upturned ends of the stay-sections, and forming a half-twist or interlock for the ends of the stay-sections before coiling or winding the ends around the longitudinal or strand wire. Each stem 155 has a shoulder or collar, which abuts against the end face of a bearing 158 on the cross-head, and the stems extend through the bearings, and each stem on its upper end has secured thereto a pinion 159, by means of which the stems are rotated. The pinions 159 are located in different vertical planes, so that, in effect, two sets of pinions are furnished, one set in a lower plane and the other set in a higher plane in relation to the top of the cross-head. The lower set of pinions 159 are in engagement with a rack 160, and the upper set of pinions are in engagement with a rack 161, and the two racks at one end are connected together by a cross plate or bar 162, so as to move in unison. Each rack 160 and 161 has in its body near each end a slot 163, through which passes a screw or locking-pin 164, the head of which bears against a washer 165, so as to allow a free movement for the rack. The pins or screws 164 enter a bracket or support 166 on a plate 167, attached to a cross-head 119, as shown in Fig. 8, so that the stems 155, the pinions of the stems, and the rack-bars will have a falling-and-rising movement with the falling and rising of the cross-head.

A pin 168 depends from the rack 161 and enters a slot 169 in an oscillating arm or lever 170, mounted on a pivot 171, extending up from the platform or plate 8, and the opposite end of the arm or lever 170 has a pin 172, on which is mounted a roller 173, engaged by a cam 174 and a cam 175, the cam 175 having an opening therein for the passage of the roller. The cams 174 and 175 are located on a cylinder or disk 176, fixedly mounted on the shaft 33 so as to revolve with the shaft. The revolving of the shaft 33 revolves the cylinder or disk 176, and with the engagement of the cam 174 with the roller 173 the arm or lever 170 is vibrated to move the racks in one direction, and with the engagement of the cam 175 with the roller 173 the arm or lever 170 operates to move the racks 160 and 161 in the opposite direction. The reciprocation of the racks 160 and 161 rotates the pinions 159 in opposite directions, thereby causing the heads of the stems 155 to engage the ends of the stay-sections and interlock such ends, and after interlocking the ends of the stay-sections the stems are given an initial backward turn and then returned to normal position with the opposite movement of the rack-bars.

The ends of the stay-sections with the descent of the stems 155 are forced between flanges 177 on plates 178, attached to the support for the coilers or twisters, so that the ends are upturned, as shown in Fig. 7, and brought into position to be caught by the lips 157 of the stems 155 and given a half-turn and interlock previous to winding or coiling around the longitudinal or strand wires. The coilers or twisters on one side have a fixed relation and on the opposite side have a rising-and-falling movement. The fixed coilers or twisters are supported by a cross-plate 179 and a flange 180 on a cross head or plate 181, which cross head or plate is attached, by means of brackets 182 and bolts 183, to a flange 184 on each vertical plate 5, as shown in Fig. 6. The rising-and-falling coilers or twisters are supported by a plate 179 and a flange 180 on a cross head or plate 185, which plate at each end has an ear or bracket-plate 186 with a wing 187, the end 188 of which enters a slot or groove 189 in the head or plate 5 and lies against a guide rib or flange 190 on the head or plate 5, so that the cross head or plate 185 is free to rise and fall and is guided and held in rising and falling. At each end of the cross head or plate 185 is secured a plate 191, having a slot 192, which receives a pin 193 on the arm 194 of a bell-crank lever pivotally mounted on a journal pin or pivot 195, extending out from the stud or boss 196 on the side rail or beam 3 of the frame. The other arm 197 of the bell-crank lever has a pin or pivot 198, on which is mounted a roller 199, which enters a cam-groove having sections 200, 201, and 202, by which the bell-crank lever is vibrated to raise and lower the cross head or plate 185 and the twisters or coilers carried thereby. The cam-groove for the roller 199 is formed in the face of a disk 203, and a disk with a bell-crank lever is provided for each end of the cross head or plate. The disks 203 are mounted on a shaft 204, supported in suitable journal-boxes 205 on the under side of the rails or beams 3 of the frame, and this shaft has fixed thereon a spur-gear 206, which meshes with the spur-pinion 38 and is driven from the shaft 39 coincident with the driving of the gear 37 and the shaft 36. The revolving of the gear 206 revolves the shaft 204, and such revolving of the shaft 204 revolves the disks 203 and causes the cam-groove in each disk to operate the bell-crank lever at each end of the cross-head 185 and raise and lower the cross head or plate 185 with the twisters or coilers carried thereby, and when raised, as shown in Fig. 11, the twisters or coilers are in position to operate and coil or wind the ends of the stay-sections around the longitudinal or strand wires, and when lowered, as shown in Fig. 10, the twisters or coilers are clear of the longitudinal or strand wires, and such wires with the stay fixed thereon can be advanced by the mechanism for feeding the longitudinal or strand wires. The bars 137 are guided and held in descending and ascending by a cross head or plate 207, attached to the cross head or plate 185 by plates 208, so as to maintain the necessary rigidity and strength and the proper relation between the parts in placing the stay-sections in position and coiling the ends of the stay-sections around the longitudinal or strand wires.

The arrangement shown has a series of coiler or twister heads carried by the fixed support formed of the plate 179 and plate or flange 180 with the cross head or plate 181. The twisters or coilers having a fixed relation are arranged in series, and they each have a head 209 of similar construction in the arrangement shown. Each head 209 carries one or two twisting-pins 210, the outer heads having a single twisting-pin which, however, for the non-acting head can be omitted, if so desired, and the remaining heads each have two twisting or coiling pins 210 to engage the adjacent ends of the stay-sections. Each coiler-head has a shaft 211, and longitudinally through the head and shaft is a hole 212 for the passage of a longitudinal or strand wire, and each coiler-shaft 211 is mounted in a journal-box 213, formed between the plates 179 and 180 in the arrangement shown. Each coiler-shaft 211 has attached thereto or formed therewith a hub or enlargement 214 with a spur-pinion 215, which meshes with a spur-pinion 216, the hub 217 of which is attached to a shaft 218, mounted in a journal box or bearing 219, formed between a plate 220 and a flange or plate 221 on a cross plate or head 222, attached by bolts 223 to a flange 224 on each head or plate 5, as shown in Fig. 6, so that the spur-gears 215 and 216 will be continuously in mesh and the twisters or coilers operated thereby. A number of the shafts 218 each have attached thereto a bevel-gear 225 by a hub 226, and the bevel-gears 225, or some of them, mesh with bevel-gears 227, attached by hubs 228 to a cross-shaft 229, supported at its ends in bearings or journal-boxes 230, so that with the revolving of the shaft 229 the shafts 218 will be given opposite directions of rotation according to the engagement of the bevel-gear 225 with the bevel-gear 227, as shown in Fig. 6. It will be noticed that some of the shafts 218 do not have a bevel-gear 225 connected therewith, and for driving these shafts a spur-gear 221, mounted on a journal-pin 232, a spur-gear 233, and a spur-gear 234, each mounted on a journal-pin 235, furnish the connection for driving the shafts 218, which are not directly driven from a bevel-gear, and this arrangement of intermediate driving-gear is shown in Fig. 8 for one end of the machine on one side and in Fig. 9 for the opposite end of the machine on one side.

The arrangement shown has a series of coilers or twisters carried by the rising-and-falling cross-head 185, and each coiler or twister has a head 236, each head having one or two coiling-pins 237, the outer heads having a single coiling-pin, which, however, can be omitted for the non-acting outer coiler-head, and the intermediate coiling-heads each have two coiling-pins, as shown in Fig. 5. Each coiler-head is carried by a shaft 238, mounted in a box or bearing 239, formed between the cap-plate 179 and the under plate or flange 180 of the rising-and-falling cross-head 185, and each coiler-shaft and head has a longitudinal hole 240 for the passage of a longitudinal or strand wire with a slot 241 extending from the hole to the exterior of the head and shaft, and with the coiler in normal position the slot 241 alines with a slot 242 in the upper part of the box or bearing 239 of the coiler-shaft, as shown in Fig. 17. Each coiler-shaft 238 has formed therewith or attached thereto a hub 243 and a spur-gear 244, and the slot 241 is continued through to the circumference of the spur-gear, as shown in Fig. 17. The slot 241 and the slot 242 allows the coilers or twisters to drop clear of the longitudinal or strand wires and to pass the longitudinal or strand wires into the bore or hole 240 when the coilers or twisters are elevated into operative position, and the drop of the coilers or twisters to clear the longitudinal or strand wires allows the fence with the sectional stay attached to the longitudinal or strand wires to be intermittently advanced or fed forward into position for the attachment of subsequent stays.

Each spur-gear 244 meshes with a spur-gear 245, having a hub 246, and mounted on a stud journal or pin 247 on a stem 248, passing through the cross-head 185 and held in place by a set-nut 249 or otherwise. Each spur-gear 245 has on its outer face a boss or head 250, with a cross-slot 251 to receive a rib or flange 252 on a head 253, so that each spur-gear 245 will be connected with a driving-head in both the depressed and elevated position of the coilers or twisters.

Each driving-head 253 is carried by a shaft 254, mounted in a journal box or bearing 255, formed between a cap-plate 256 and an under plate or flange 257 on a fixed cross-head 258, attached by bolts 259 or otherwise to the cross flange or plate 224 on the heads or plates 5 at each side of the frame. The shafts 254, as to certain ones thereof, each have a bevel gear or pinion 260 meshing with a bevel gear or pinion 261, attached by hubs 262 to a driving-shaft 263, which shaft is supported at the ends in suitable journal boxes or bearings 264, as shown in Fig. 6. The bevel-pinions 260 and 261 are arranged so as to give opposite rotation to the driving-heads 252, as indicated by the arrow in Fig. 6, and it will be noticed that some of the driving-heads 253 do not have the shaft 254 provided with a driving pinion or gear, and these heads are driven by an arrangement of gearing corresponding to that described for driving the shafts 218 on the opposite side of the machine and illustrated in Figs. 8 and 9. The driving-heads 253 have a fixed relation, and by means of the rib or flange 252 and the slot 251 each driving-head 253 is maintained in engagement with the shaft of a twister or coiler irrespective of the position of the movable cross-head carrying the coilers or twisters, so that whether the coilers or twisters are depressed or elevated the connection for driving the coilers or twisters remains intact.

The shaft 229 has fixed to one end thereof a spur-pinion 265, having a hub 266 and arranged to mesh with a section of a spur-gear 267, as shown in Fig. 18. The hub 266 of the spur-pinion 265 has a finger 268 in the path of travel of a lug or abutment 269, carried by the main gear, by which engagement of the finger with the abutment the intermeshing of the pinion with the mutilated gear is positively assured at the proper time. A circular track or rest 270 is connected with the main gear of the sectional or mutilated gear 267 by rods and collars 271, as shown in Figs. 1 and 18, and this track or rest coacts with the hub of the driving-pinion and holds the pinion in a state of rest, thereby giving an intermittent rotation to the driving-pinion 265 at regular intervals. The sectional or mutilated gear 267 is formed on the side face of a continuous gear 272, mounted on a shaft 273, supported in journal-boxes 274 and meshing with a spur-pinion 275 on the shaft 39 for the rotation of the shaft 239 to drive the full gear 272 and through the sectional or mutilated gear 267 drive the pinion 265 intermittently. The shaft 39 is mounted in a journal box or boxes 276, and the shaft 42 is mounted in a journal-box 277, and the journal-boxes 274, 276, and 277 are fixed on the upper pieces or top rail 278 of a supplemental frame having a base-rail 279 and uprights 280, as shown in Fig. 2, and the shaft 273 has one of its journal boxes or bearings 274 on a boss or upright 281, as shown in Fig. 1. A boss or upright 282 extends up from the supplemental frame, and this post or upright at its upper end has bolted or otherwise secured thereto the journal box or bearing 230 for the shaft 229 at one end. It will be seen that the several mechanisms are driven from a common power-transmitting shaft through the various gears, as described.

The hub 266 of the spur-pinion 265 has formed therewith a bevel gear or pinion 283, which meshes with a bevel gear or pinion 284, the hub 285 of which is fixed on a cross-shaft 286, mounted in suitable journal boxes or bearings 287, attached to the shelf 13, as shown in Fig. 6. The opposite end of the shaft 286 has a bevel gear or pinion 288, which meshes with a bevel gear or pinion 289 on the end of the shaft 263, as shown in Fig. 6. The intermittent rotation of the driving-pinion 265 through the bevel-pinions 283, 284, 288, and 289 drives the shafts 229 263 in opposite directions, as indicated by the arrows in Fig. 6, so that the shafts 229 and 263, through the bevel-pinions 227 and 261, will drive, respectively, the bevel-pinions 225 and 260 and through the intermeshing spur-gears drive the twisters or coiler-heads in opposite directions, as indicated by the arrows in Fig. 6, for the pins of the twister or coiler heads to engage the ends of the stay-sections and coil or wind the ends of the stay-sections around the respective longitudinal or strand wires.

The shaft 36 adjacent to the spur-gear 35 has fixedly attached to its end a crank 290, having a pivot or wrist pin 291, to which is connected one end of a link or bar 292, the free end of which has a slot 293, into which is entered a pivot or wrist pin 294, projecting out from the end of an arm or lever 295, so that the revolving of the crank 290 will give a reciprocating movement to the lever 295 during a portion of the revolution of the crank. The arm or lever 295 has a pin or pivot 296, carrying a spring-controlled pawl 297, which engages with the teeth of a ratchet-wheel 298, formed with or secured to a sprocket-wheel 299, with the sprocket-wheel and ratchet mounted on a journal 300, formed by reducing the end of the shaft 204 in the arrangement shown. The ratchet 298 and the sprocket-wheel 299 are loose on the journal 300, and the head of the arm or lever 295 is also loosely mounted on the journal 300, and the parts are held in position by a collar 301 and a set-screw 302 or in any other suitable manner, so that the arm or lever 295 is free to be oscillated back and forth from the crank 290 and give an intermittent rotation to the sprocket-wheel by the engagement of the pawl 297 with the ratchet 298 from the movements of the arm or lever 295, the forward throw of the arm or lever engaging the pawl and ratchet-wheel and the backward throw of the arm or lever carrying the pawl over the teeth of the ratchet-wheel. The slot 293 furnishes the required amount of lost motion to allow of the full revolution of the crank 290 to give a forward and back throw to the arm or lever 295 at each complete revolution of the crank. The sprocket-wheel 299 drives a sprocket-chain 303, by means of which a reel or carrier for the completed fence is intermittently driven, such reel or carrier not being shown. The shaft 42 is driven by a fast and loose pulley 304, (shown partly broken away in Fig. 1 and by dotted lines in Fig. 2,) the fast and loose pulley being operated by a driving-belt or otherwise in any usual and well-known manner from a source of power.

The machine shown operates in connection with seven longitudinal or strand wires (indicated by numerals 305, 305$^a$, 305$^b$, 305$^c$, 305$^d$, 305$^e$, and 305$^f$ in Figs. 5 and 6,) and each longitudinal or strand wire passes through a fixed coiler or twister and a movable coiler or twister from a spool or other source of supply. (Not shown.) The sectional stays are formed from two leads of wire 306 and 307, passing from suitable spools or other supports. (Not shown.) The main stay-wires 306 and 307 after being infed or advanced to position in the holders and carriers and severed by the operation of the fixed and movable cutters form stay-sections 308, 308$^a$, 308$^b$, 308$^c$, 308$^d$, and 308$^e$, the stay-sections 308, 308$^b$, and 308$^d$ being formed from the main wire 306 and the stay-sections 308$^a$, 308$^c$, and 308$^e$ being formed from the main wire 307, and the stay-sections as a whole when united to the longitudinal or strand wires form a continuous stay, extending across the fence from the top to the bottom of the longitudinal or strand wires and united to the top and bottom and the intermediate longitudinal or strand wires, as shown in Figs. 5 and 6. The ends of the section 308 and 308$^e$ are coiled around the longitudinal or strand wires 305 and 305$^f$ and the coils 309 are in opposite directions, as shown in Figs. 5 and 6. The adjacent ends of the stay-sections for the intermediate longitudinal or strand wires are coiled around the longitudinal or strand wires and the coils 309 are in opposite directions, as shown in Figs. 5 and 6.

The operation will be understood from the foregoing description of the parts or mechanisms, but briefly is as follows: The main stay-wires 306 and 307 are fed into the machine by the operation of the feed-wheels 20 and 21 until each wire has passed beyond the longitudinal or strand wire farthest removed from the entering side of the stay-wires into the holders 50 and the carrier-arms 85 on opposite sides of the opening 9 between the sections or divisions of the platform or table 8, and at the cessation of the feed of the main stay-wires the cutters operate and sever the stay-wires into the sections for the stay. The carriers, with the stay-sections released from the retainers or holders 50 and caught and held between the jaws 43 and 44 of the clamp, are advanced into the position shown in Fig. 5, bringing the stay-sections into position beneath the stems or plungers 135 and over the heads 136 for the descent of the stems or plungers 135 to carry down the stay-sections and have the stay-sections caught and held between the stems or plungers 135 and the heads 136 in position for the operation of the coilers or twisters to coil or wind the ends of the stay-sections around the longitudinal or strand wires. The descent of the cross-head 119 to force down the stems or plungers 135 also forces down the stems 155 for the heads 156 in conjunction with the rests 177 to upturn the ends of the stay-sections, as shown in Fig. 7, and with the full descent of the stems 155 the stems are given a rotation from the pinions 159 and the rack-bars 160 and 161, by which the lips 157 will engage the upturned ends of the stay-sections and interlock the ends. The interlocking of the ends reverses the position and brings the ends in proper rotation to the coiling-pins 210 and 237 for the rotation of the coilers to wind or coil the ends of the stay-sections around the longitudinal or strand wires, completing the attachment of the stay to the longitudinal or strand wires, as shown for the completed fence in Figs. 5 and 6. The coiler-pins 210 and 237 are operated by the rotation of the respective coiler-heads 209 and 236, and the coiler-heads 209 are rotated by the intermeshing spur-gears 215 and 216 from the bevel-pinions 227 and 228 from the shaft 229, and the twister or coiler heads 236 are operated from the spur-pinions 244 and 245 from the bevel-gear 260 and 261 by the driving-shaft 263, so that both sets or series of coilers will be operated simultaneously. After the completion of the coiling or winding of the ends of the stay-sections around the longitudinal or strand wires the coiler-heads 236 drop into the lowermost position clear of the longitudinal or strand-wires and the completed fence is advanced into position for the reception of the next stay through the operation of the crank 290, as hereinbefore described. The advance of the longitudinal or strand wires is automatically performed, and during such advance the main stay-wires can be fed into position for severance and the carrying forward of the stay-sections and delivery of the stay-sections into position for coiling or winding the ends around the longitudinal or strand wires. The operation of the several mechanisms is automatic after the machine has been threaded up, and the operations can be continued until the required amount of fencing has been produced, it being understood that after one length of longitudinal or strand wire has been delivered from the spool or spools a new length can be joined, so that the making of the fence can be continued indefinitely, and this is also true of the main stay-wires, a new length of stay-wire being joined, if so required.

The coils or wraps 309 for the ends of the stay-sections around the longitudinal or strand wires, it will be noticed by reference to Figs. 5 and 6, are in opposite directions—that is, the end of one section will be coiled or wrapped to the left around the longitudinal or strand wire and the end of the adjacent section will be coiled or wrapped to the right around the longitudinal or strand wire, so that by reason of the opposite coiling or wrapping of the ends of the stay-sections around the longitudinal or strand wires in connection with the interlocking of the adjoining ends of two sections of the stay a firm attachment of the stays to the longitudinal or strand wires is obtained which will prevent the displacement or throwing out of line of the sections of the stay when attached. The machine is positive in its operation and will produce a fence having the stays firmly locked in position on the longitudinal or strand wires. It will be understood that the number of longitudinal or strand wires can be varied and the length of the stays can also be varied to suit the height of the fence, which is governed by the number and distance apart of the longitudinal or strand wires.

What I claim as new, and desire to secure by Letters Patent, is—

1. In a wire-fence machine, the combination of a table having a central opening endwise thereof, a series of movable clamps on each side of the opening in the table, and receiving the two wires for the stay, and means for advancing and receding the clamps, substantially as described.

2. In a wire-fence machine, the combination of a table having a central opening endwise thereof, a series of movable clamps on each side of the opening in the table, each clamp consisting of a fixed jaw and a movable jaw and receiving between the jaws the two wires for the stay, and means for advancing and receding the clamps, substantially as described.

3. In a wire-fence machine, the combination of a table having a central opening endwise thereof, a series of movable clamps on each side of the opening in the table each clamp consisting of a fixed jaw and a movable jaw with a groove in the movable jaw receiving thereinto the wire for the stay, and means for advancing and receding the clamps, substantially as described.

4. In a wire-fence machine, the combination of a table having a central opening endwise thereof, a series of movable clamps on each side of the opening in the table, each clamp consisting of a fixed jaw and a movable jaw, a sliding stem for each movable jaw, a spring encircling the stem, and means for advancing and receding the clamps, substantially as described.

5. In a wire-fence machine, the combination of a table having a central opening endwise thereof, a series of retainers on each side of the opening in the table, each retainer having a groove receiving a stay-wire, and means for raising and depressing the retainers and releasing the stay-wire, substantially as described.

6. In a wire-fence machine, the combination of a table having a central opening endwise thereof, a series of rocking retainers on each side of the opening in the table each retainer having a groove receiving a stay-wire, and means for raising and depressing the retainers and releasing the stay-wires, substantially as described.

7. In a wire-fence machine, the combination of a table having a central opening endwise thereof, a series of retainers on each side of the opening in the table, each retainer mounted on a bearing and having a groove receiving a stay-wire, and means for raising and depressing the retainers and releasing the stay-wire, substantially as described.

8. In a wire-fence machine, the combination of a table having a central opening endwise thereof, a series of retainers on each side of the opening in the table, each retainer mounted on a bearing and having a groove receiving a stay-wire, an arm for each retainer, an actuating-rod common to all the retainers on each side, and means for moving the actuating-rod, substantially as described.

9. In a wire-fence machine, the combination of a table having a central opening endwise thereof, a series of retainers on each side of the opening in the table, each retainer mounted on a bearing and having a groove receiving a stay-wire, a strap for each end of each actuating-rod, a supporting-rod for the straps of one of the actuating-rods, arms on the supporting-rod, a bell-crank lever for each end of the supporting-rod, and means for actuating the bell-crank levers, substantially as described.

10. In a wire-fence machine, the combination of a table having a central opening endwise thereof, a series of retainers on each side of the opening in the table, each retainer mounted on a bearing and having a groove receiving a stay-wire, a strap for each end of each actuating-rod, a supporting-rod for the straps of one of the actuating-rods, arms on the supporting-rod, a bell-crank lever for each end of the supporting-rod, a shoe on each bell-crank lever, an engaging roller and track for each shoe, and a revoluble disk for each roller and shoe, substantially as described.

11. In a wire-fence machine, the combination of a table having a central opening endwise thereof, a series of movable clamps on each side of the opening in the table and receiving the two wires for the stay, means for advancing and receding the clamps, a series of retainers on each side of the opening in the table, each retainer mounted on a bearing and having a groove receiving a stay-wire, means for raising and depressing the retainers and releasing the stay-wire, a series of fixed cutters on each side of the opening in the table, a series of movable cutters on each side of the opening in the table, and means for actuating the movable cutters for severing the stay-wires into stay-sections, substantially as described.

12. In a wire-fence machine, the combination of a table having a central opening endwise thereof, a series of movable clamps on each side of the opening in the table and receiving the two wires for the stay, means for advancing and receding the clamps, a series of retainers on each side of the opening in the table, each retainer mounted on a bearing and having a groove receiving a stay-wire, an arm for each retainer, an actuating-rod common to all the retainers on each side, means for moving the actuating-rods, a series of fixed cutters on each side of the opening in the table, a series of movable cutters on each side of the opening in the table, an arm for each movable cutter connected on each side with the actuating-rod of the retainers, and means for moving each actuating-rod, substantially as described.

13. In a wire-fence machine, the combination of a table having a central opening endwise thereof, a series of movable clamps on each side of the opening in the table and receiving the two wires for the stay, means for advancing and receding the clamps, a series of retainers on each side of the opening in the table, each retainer mounted on a bearing and having a groove receiving a stay-wire, an arm for each retainer, an actuating-rod common to all the retainers on each side, means for moving the actuating-rods, a series of fixed cutters on each side of the opening in the table, a series of movable cutters on each side of the opening in the table, an arm for each movable cutter connected on each side with the actuating-rod of the retainers, a strap for each end of each actuating-rod, a supporting-rod for the straps of one of the actuating-rods, arms on the supporting-rod, a bell-crank lever for each end of the supporting-rod, and means for oscillating the bell-crank levers, substantially as described.

14. In a wire-fence machine, the combination of a table having a central opening endwise thereof, a series of movable clamps on each side of the opening in the table and receiving the two wires for the stay, means for advancing and receding the clamps, a series of retainers on each side of the opening in the table, each retainer mounted on a bearing and having a groove receiving a stay-wire, an arm for each retainer, an actuating-rod common to all the retainers on each side, means for moving the actuating-rods, a series of fixed cutters on each side of the opening in the table, a series of movable cutters on each side of the opening in the table, an arm for each movable cutter connected on each side with the actuating-rod of the retainers, a strap for each end of each actuating-rod, a supporting-rod for the straps of one of the actuating-rods, arms on the supporting-rod, a bell-crank lever for each end of the supporting-rod, a shoe on each bell-crank lever, an engaging roller and track for each shoe, and a movable disk for each roller and shoe, substantially as described.

15. In a wire-fence machine, the combination of a table having a central opening endwise thereof, a series of carriers on each side of the opening in the table, each carrier having side arms and a cross-plate, a clamp for each side arm of each carrier receiving a stay-wire, and means for advancing and receding the carriers, substantially as described.

16. In a wire-fence machine, the combination of a table having a central opening endwise thereof, a series of carriers on each side of the opening in the table each carrier having side arms and a cross-plate, a retainer between the side arms of each carrier for receiving a stay-wire, and means for advancing and receding the carriers, substantially as described.

17. In a wire-fence machine, the combination of a table having a central opening endwise thereof, a series of carriers on each side of the opening in the table, each carrier having side arms and a cross-plate, a clamp for each side arm of each carrier and receiving a stay-wire, a retainer between the side arms of each carrier and receiving a stay-wire, and means for advancing and receding the carriers, substantially as described.

18. In a wire-fence machine, the combination of a table having a central opening endwise thereof, a series of carriers on each side of the opening the table each carrier having side arms and a cross-plate, a clamp for each side arm of each carrier, each clamp consisting of a fixed jaw and a movable jaw and receiving between the jaws a stay-wire, a rocking retainer between the side arms of each carrier and having a groove receiving a stay-wire, means for rocking the retainers, and means for advancing and receding the carriers, substantially as described.

19. In a wire-fence machine, the combination of a table having a central opening endwise thereof, a series of carriers on each side of the opening in the table, each carrier having side arms and a cross-plate, a clamp for each side arm of each carrier, each clamp consisting of a fixed jaw and a movable jaw and receiving between the jaws a stay-wire, a rocking retainer between the side arms of each carrier and having a groove receiving a stay-wire, an arm for each retainer, an actuating-rod common to all the retainers on each side, and means for moving the actuating-rod, substantially as described.

20. In a wire-fence machine, the combination of a table having a central opening endwise thereof, a series of carriers on each side of the opening in the table, each carrier having side arms and a cross-plate, a clamp for each side arm of each carrier, each clamp consisting of a fixed jaw and a movable jaw and receiving between the jaws a stay-wire, a rocking retainer between the side arms of each carrier and having a groove receiving a stay-wire, an arm for each retainer, an actuating-rod common to all the retainers on each side, a strap for each end of each actuating-rod, a supporting-rod for the straps of one of the actuating-rods, arms on the supporting-rod, a bell-crank lever for each end of the supporting-rod, means for actuating the bell-crank levers, and means for advancing and receding the carrier, substantially as described.

21. In a wire-fence machine, the combination of a table having a central opening endwise thereof, a series of carriers on each ide of the opening in the table, each carrier having side arms and a cross-plate, a clamp for each side arm of each carrier, each clamp consisting of a fixed jaw and a movable jaw and receiving between the jaws a stay-wire, a rocking retainer between the side arms of each carrier and having a groove receiving a stay-wire, an arm for each retainer, an actuating-rod common to all the retainers on each side, a strap for each end of each actuating-rod, a supporting-rod for the straps of one of the actuating-rods, arms on the supporting-rod, a bell-crank lever for each end of the supporting-rod, a shoe on each bell-crank lever, an engaging roller and track for each shoe, a revoluble disk for each roller and shoe, and means for advancing and receding the carriers, substantially as described.

22. In a wire-fence machine, the combination of a table having a central opening endwise thereof, a series of carriers on each side of the opening in the table, each carrier having side arms and a cross-plate, a clamp for each side arm of each carrier and receiving a stay-wire, a retainer between the side arms of each carrier and receiving a stay-wire, means for advancing and receding the carriers, a series of fixed cutters on each side of the opening in the table, a series of movable cutters on each side of the opening in the table, and means for operating the movable cutters, substantially as described.

23. In a wire-fence machine, the combination of a table having a central opening endwise thereof, a series of carriers on each side of the opening in the table, each carrier having side arms and a cross-plate, a clamp for each side arm of each carrier, each clamp consisting of a fixed jaw and a movable jaw and receiving between the jaws a stay-wire, a rocking retainer between the side arms of each clamp and having a groove receiving a stay-wire, an arm for each retainer, an actuating-rod common to all retainers on each side, a strap for each end of each actuating-rod, a supporting-rod for the strap of one of the actuating-rods, arms on the supporting-rod, a bell-crank lever for each end of the supporting-rod, means for operating the bell-crank lever, a series of fixed cutters on each side of the opening in the table, a series of movable cutters on each side of the opening in the table, an arm for each movable cutter connected on each side with the actuating-rod of the retainers, and means for advancing and receding the carriers, substantially as described.

24. In a wire-fence machine, the combination of a table having a central opening endwise thereof, a series of carriers on each side of the opening in the table, each carrier having side arms and a cross-plate, a clamp for each side arm of each carrier, a rocking retainer between the side arms of each carrier, the clamps and retainers receiving a stay-wire, means for rocking the retainers, a series of bell-crank levers, one lever for each carrier, a plate connecting the bell-crank levers on each side, a cross-strap connecting the side plates of the bell-crank levers, an arm engaging one of the side plates of the bell-crank levers, and means for oscillating the arm and advancing and receding the carriers, substantially as described.

25. In a wire-fence machine, the combination of a table having a central opening endwise thereof, a series of carriers on each side of the opening in the table, each carrier having side arms and a cross-plate, a clamp for each side arm of each carrier, a rocking retainer between the side arms of each carrier, the clamp and retainers receiving a stay-wire, means for rocking the retainers, a series of bell-crank levers, one lever for each carrier, a plate connecting the bell-crank levers on each side, a cross-strap connecting the side plates of the bell-crank levers, an arm engaging one of the side plates of the bell-crank levers, a cam engaging the arm, and a revoluble shaft carrying the cam for advancing and receding the carriers, substantially as described.

26. In a wire-fence machine, the combination of a bed-plate having a central opening endwise thereof, a series of carriers on each side of the opening of the table, each carrier having side arms and a cross-plate, a clamp for each side arm of each carrier, a retainer between the side arms of each retainer, the clamps and retainers on each side receiving a stay-wire, means for advancing and receding the carriers, means for rocking the retainers, a series of fixed cutters and a series of movable cutters on each side of the opening in the table, a rising-and-falling cross-head, a series of stems carried by the cross-head, a series of depressible heads coacting with the stems and forming therewith clamps to centrally hold the severed stay-sections in position, means for raising and lowering the cross-head, a series of revoluble stems depending from the cross-head, each stem having twister-lips, and means for revolving the stems and interlocking the adjacent ends of the stay-sections, substantially as described.

27. In a wire-fence machine, the combination of a series of twisters having a fixed relation, a series of opposing twisters having a rising-and-falling movement, intermeshing pinions for revolving the fixed twisters, intermeshing pinions for revolving the movable twisters, driving-pinions for the pinions of the fixed twisters, driving-pinions for the pinions of the movable pinions, and a revoluble shaft for each set of driving-pinions, substantially as described.

28. In a wire-fence machine, the combination of a fixed cross-head carrying a series of twisters, a rising-and-falling cross-head carrying a series of twisters, a bell-crank lever for each end of the rising-and-falling cross-head, a cam for each bell-crank lever, a revoluble shaft carrying the cams, a shaft for each twister of the fixed cross-head, each shaft having a longitudinal hole for the passage of a stay-wire, a shaft for each twister of the rising-and-falling cross-head, each shaft having a longitudinal hole and a slot for entering and withdrawing a stay-wire, intermeshing pinions for the shaft of each twister of the fixed cross-head, driving-pinions for revolving the intermeshing pinions of the shafts for the twisters of the fixed cross-head, an intermeshing pinion for the shaft of each twister of the rising-and-falling cross-head, one of the intermeshing pinions having a slotted head, driving-pinions having tongues engaging the slots of the intermeshing pinions of the twisters for the rising-and-falling cross-head, and a revoluble shaft for each set of driving-pinions, substantially as described.

29. In a wire-fence machine, the combination of a fixed cross-head carrying a series of twisters, a rising-and-falling cross-head carrying a series of twisters, a bell-crank lever for each end of the rising-and-falling cross-head, a cam for each bell-crank lever, a revoluble shaft carrying the cams, a shaft for each twister of the fixed cross-head, each shaft having a longitudinal hole for the passage of a stay-wire, a shaft for each twister of the rising-and-falling cross-head, each shaft having a longitudinal hole and a slot for entering and withdrawing a stay-wire, intermeshing pinions for the shaft of each twister of the fixed cross-head, intermeshing pinions for the shaft of each twister of the rising-and-falling cross-head one of the intermeshing pinions having a slotted head, driving-pinions having tongues engaging the slots of the intermeshing pinions of the twisters for the rising-and-falling cross-head, a revoluble shaft for each set of driving-pinions, a cross-shaft and intermeshing pinions for the revoluble shafts, a pinion on one of the revoluble shafts, and a segmental gear for driving the last-named pinion, substantially as described.

30. In a wire-fence machine, the combination of a fixed cross-head carrying a series of twisters, a rising-and-falling cross-head carrying a series of twisters, a bell-crank lever for each end of the rising-and-falling cross-head, a cam for each bell-crank lever, a revoluble shaft carrying the cams, a shaft for each twister of the fixed cross-head, each shaft having a longitudinal hole for the passage of a stay-wire, a shaft for each twister of the rising-and-falling cross-head, each shaft having a longitudinal hole and a slot for entering and withdrawing a stay-wire, intermeshing pinions for the shaft of each twister of the fixed cross-head, intermeshing pinions for the shaft of each twister of the rising-and-falling cross-head, one of the intermeshing pinions having a slotted head, driving-pinions having tongues engaging the slots of the intermeshing pinions of the twisters for the rising-and-falling cross-head, a revoluble shaft for each set of driving-pinions, a cross-shaft and intermeshing pinions for the revoluble shafts, a pinion on one of the revoluble shafts, a segmental gear for driving the last-named pinion, a finger on the last-named pinion, and an abutment on the main gear of the segmental gear engaging the finger and throwing the pinion and segmental gear into mesh, substantially as described.

31. In a wire-fence machine, the combination of a fixed cross-head carrying a series of twisters, a rising-and-falling cross-head carrying a series of twisters, a bell-crank lever for each end of the rising-and-falling cross-head, a cam for each bell-crank lever, a revoluble shaft carrying the cams, a shaft for each twister of the fixed cross-head, each shaft having a longitudinal hole for the passage of a stay-wire, a shaft for each twister of the rising-and-falling cross-head, each shaft having a longitudinal hole and a slot for entering and withdrawing a stay-wire, intermeshing pinions for the shaft of each twister of the fixed cross-head, intermeshing pinions for the shaft of each twister of the rising-and-falling cross-head, one of the intermeshing pinions having a slotted head, driving-pinions having tongues engaging the slots of the intermeshing pinions of the twisters for the rising-and-falling cross-head, a revoluble shaft for each set of driving-pinions, a cross-shaft and intermeshing pinions for the revoluble shafts, a pinion on one of the revoluble shafts, a segmental gear for driving the last-named pinion, a finger on the last-named pinion an abutment on the main gear of the segmental gear engaging the finger and throwing the pinion and segmental gear into mesh, a main gear and a train of gear for driving the multilated gear, substantially as described.

32. In a wire-fence machine, the combination of two oppositely-revolving main shafts, a series of driving-pinions on each shaft, a series of driven pinions in mesh with the series of driving-pinions of each shaft, a shaft for each pinion of one series of driven pinions, a shaft having an interlocking head for each pinion of the other series of driven pinions, a second series of driven shafts revoluble from the series of interlocking heads, a series of fixed twisters revoluble from the series of driving and driven pinions of one main shaft, and a series of rising-and-falling twisters driven from the series of driving and driven pinions and the series of interlocking heads of the other main shaft, the fixed twisters each having a shaft with a central longitudinal hole for a strand-wire and the movable twisters each having a shaft with a central longitudinal hole and a lateral slot for a strand-wire, substantially as described.

33. In a wire-fence machine, the combination of two oppositely-revolving main shafts, a cross-shaft connecting and driving the two main shafts, a pinion on one main shaft, a segmental gear for driving the pinion, a series of driving-pinions on each shaft, a series of driven-pinions in mesh with the series of driving-pinions of each shaft, a shaft for each pinion of one series of driven pinions, a shaft having an interlocking head for each pinion of the other series of driven pinions, a second series of driven shafts revoluble from the series of interlocking heads, a series of fixed twisters revoluble from the series of driving and driven pinions of one main shaft, and a series of rising-and-falling twisters driven from the series of driving-and-driven pinions and the series of interlocking heads of the other main shaft, the fixed twisters each having a shaft with a central longitudinal hole for a strand-wire and the movable twisters each having a shaft with a central longitudinal hole, and a lateral slot for a strand-wire, substantially as described.

34. In a wire-fence machine, the combination of two oppositely-revolving main shafts, a cross-shaft connecting and driving the two main shafts, a pinion on one main shaft, a segmental gear for driving the pinion, a continuous gear carrying the segmental gear, a finger on the pinion, an abutment traveling with the continuous gear, a series of driving-pinions on each shaft, a series of driven-pinions in mesh with the series of driving-pinions of each shaft, a shaft for each pinion of one series of driven pinions, a shaft having an interlocking head for each pinion of the other series of driven pinions, a second series of driven shafts revoluble from the series of interlocking heads, a series of fixed twisters revoluble from the series of driving and driven pinions of one main shaft, and a series of rising-and-falling twisters driven from the series of driving and driven pinions and the series of interlocking heads of the other main shaft, the fixed twisters each having a shaft with a central longitudinal hole for a strand-wire and the movable twisters each having a shaft with a central longitudinal hole, and a lateral slot for a strand-wire, substantially as described.

35. In a wire-fence machine, the combination of two oppositely-revolving main shafts, a series of twisters for each main shaft and revoluble therefrom, each twister of one series consisting of a shaft having a central longitudinal hole for the passage of a strand-wire, and each twister of the other series consisting of a shaft having a central longitudinal hole and a lateral slot for the passage of a strand-wire, means for giving the twisters on the delivery side of the machine a rising-and-falling movement, a slotted head for each twister of the rising-and-falling series, and a revoluble head having a cross-flange engaging the slot of the twister-head for maintaining a driving connection for the series of rising-and-falling twisters, substantially as described.

JOHN E. FREDRICK.

Witnesses:
Chas. L. Hummel,
George W. Charles.